(12) United States Patent
Li

(10) Patent No.: US 9,946,789 B1
(45) Date of Patent: Apr. 17, 2018

(54) CLASSIFYING ELECTRONIC MESSAGES USING INDIVIDUALIZED ARTIFICIAL INTELLIGENCE TECHNIQUES

(71) Applicant: Shenzhen Cestbon Technology Co. Limited, Shenzhen (CN)

(72) Inventor: Kedan Li, Emeryville, CA (US)

(73) Assignee: Shenzhen Cestbon Technology Co. Limited, Guangdong (CN)

( * ) Notice: Subject to any disclaimer, the term of this patent is extended or adjusted under 35 U.S.C. 154(b) by 0 days.

(21) Appl. No.: 15/582,571

(22) Filed: Apr. 28, 2017

(51) Int. Cl.
| | |
|---|---|
| *G06F 7/00* | (2006.01) |
| *G06F 17/30* | (2006.01) |
| *H04L 12/58* | (2006.01) |
| *G06N 99/00* | (2010.01) |
| *G06F 17/27* | (2006.01) |

(52) U.S. Cl.
CPC .... *G06F 17/30705* (2013.01); *G06F 17/2705* (2013.01); *G06F 17/277* (2013.01); *G06F 17/30011* (2013.01); *G06N 99/005* (2013.01); *H04L 51/22* (2013.01)

(58) Field of Classification Search
CPC ......... G06F 17/30598; G06F 17/30684; G06F 17/30705; G06F 17/2785; G06F 17/3071
USPC .................. 707/737; 715/702, 752
See application file for complete search history.

(56) References Cited

U.S. PATENT DOCUMENTS

| | | | | |
|---|---|---|---|---|
| 8,825,472 | B2 * | 9/2014 | Raghuveer | G06F 17/2785 704/10 |
| 8,949,283 | B1 * | 2/2015 | Cornwell | H04L 51/12 707/802 |
| 2010/0332428 | A1 * | 12/2010 | McHenry | G06F 17/3071 706/12 |
| 2012/0239650 | A1 * | 9/2012 | Kim | G06F 17/3071 707/737 |
| 2012/0303624 | A1 * | 11/2012 | Gandhi | G06F 17/2785 707/740 |
| 2013/0297604 | A1 * | 11/2013 | Sutedja | G06Q 10/107 707/737 |
| 2015/0295869 | A1 * | 10/2015 | Li | G06F 17/2785 709/206 |
| 2015/0310099 | A1 * | 10/2015 | Convertino | G06F 17/30707 707/739 |

\* cited by examiner

*Primary Examiner* — Cheyne D Ly
(74) *Attorney, Agent, or Firm* — Kwan & Olynick LLP

(57) ABSTRACT

An example method includes: identifying message labels for electronic messages; identifying, based on a classification model specific to a first user, a first and a second message labels for a first and a second electronic messages; detecting a user action by the first user on the second electronic message to indicate the first message label is descriptive of the second electronic message; responsive to the user action, re-training the classification model based on tokens produced from the second electronic message to produce an updated classification model specific to the first user; after re-training is completed, detecting an incoming electronic message having a timestamp later in time than timestamps for the first and the second electronic messages; determining that the incoming electronic message shares a predefined number of tokens with the second electronic message; and assigning, based on the updated classification model, the first message label to the incoming electronic message.

20 Claims, 13 Drawing Sheets

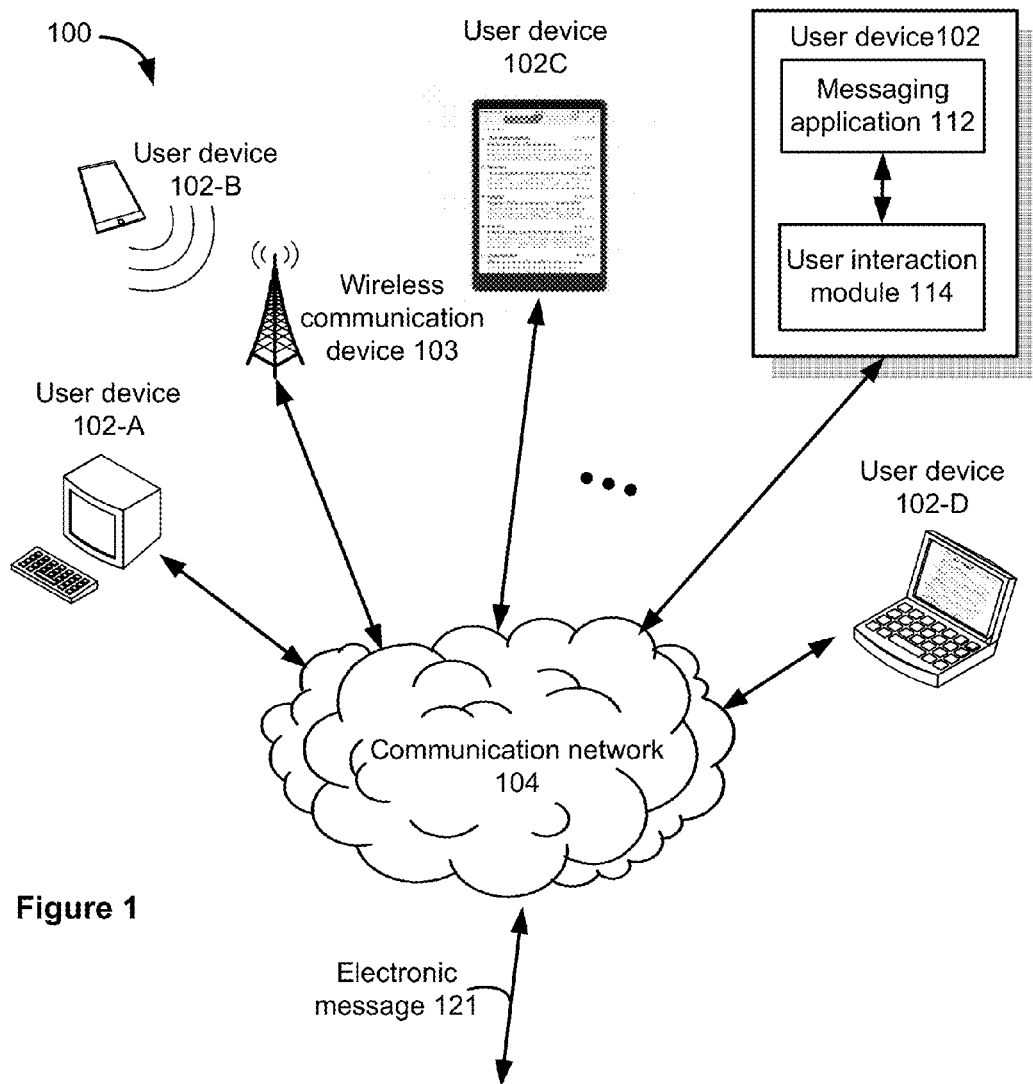
Figure 1
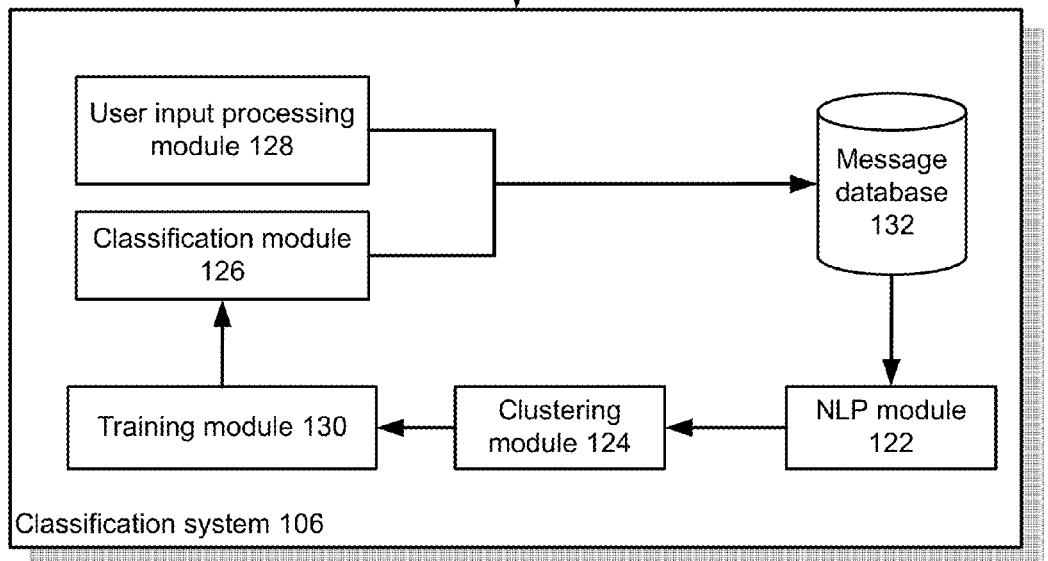

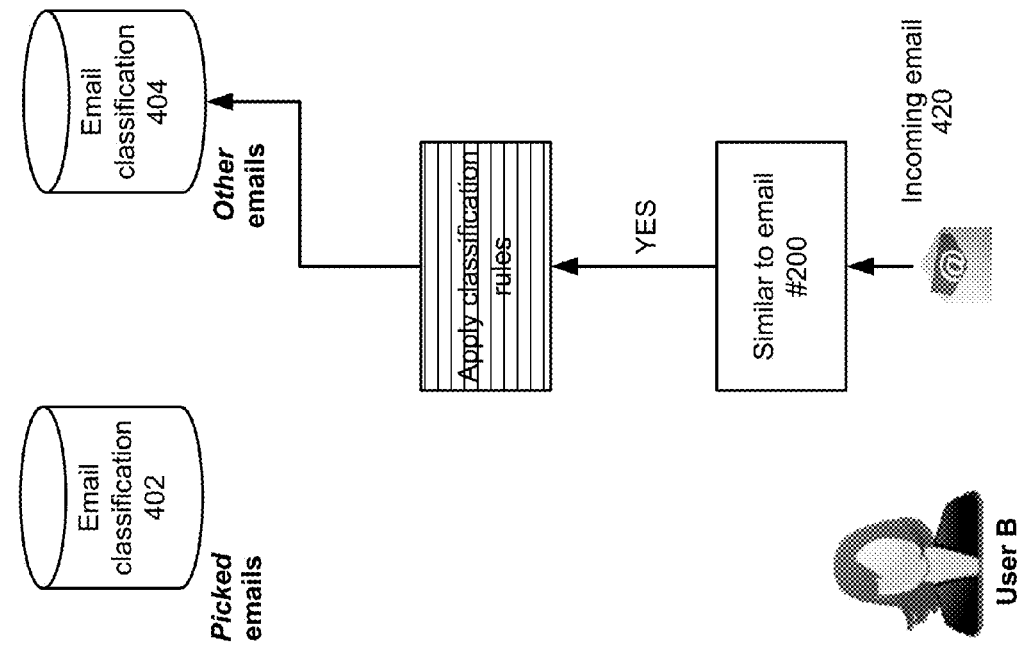
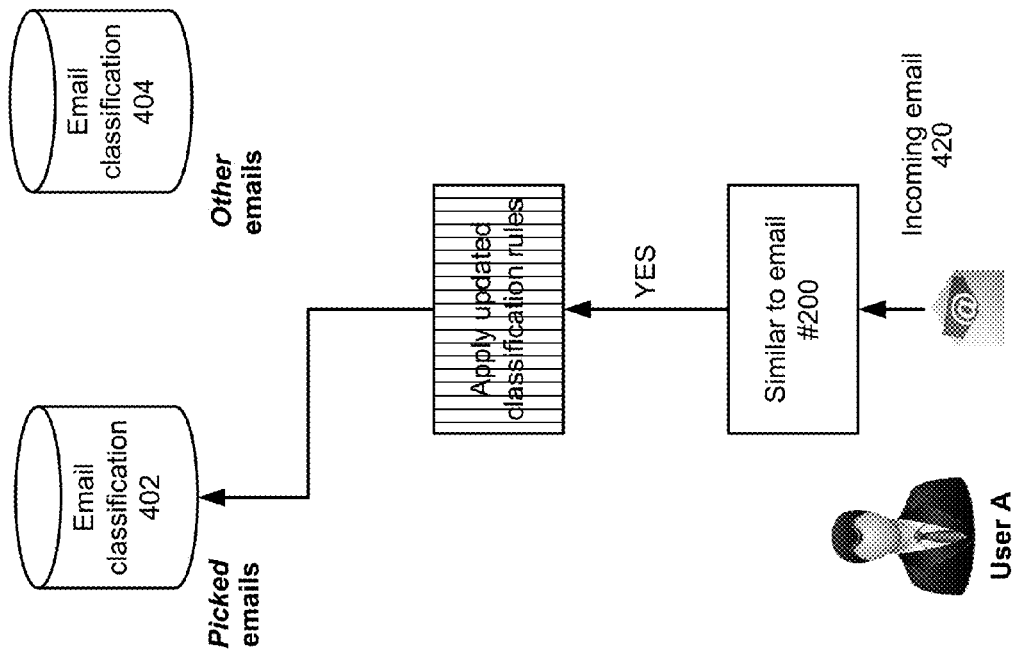
Figure 4B

500

502
Obtain a plurality of electronic messages associated with a user.
The plurality of electronic messages include a first electronic message and a second electronic message.

503

504
Apply one or more natural language processing techniques to the plurality of electronic messages to produce a plurality of tokens.

506
Generate a first message cluster and a second message cluster based on the plurality of tokens.
The first message cluster includes the first electronic message and the second message cluster includes the second electronic message.

508
Assign, using a classification model, a first message label to messages included in the first electronic cluster and a second message label to messages included in the second electronic cluster.

*Training or retraining of the classification model*

Figure 5A

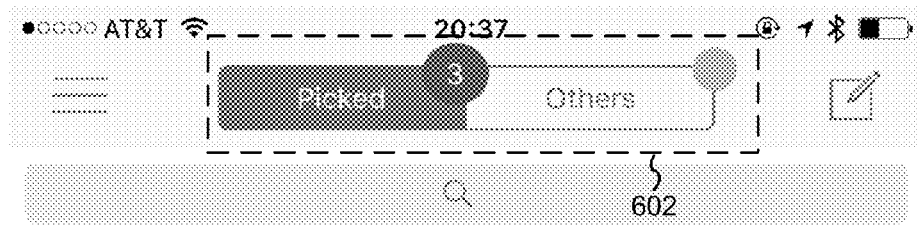

604 Unread

| | Uber 收据 | 7:17 PM |

星期三 晚上的 Uber 行程

US$16.69 Kedan, 感谢您选择 Uber 2017年4月26日 拼车 您在 19:15 之前到达。 18:50 | 2401 Kerner Blvd, San Rafael, CA 19:16 | 2107-2121 Dwight Wa...

Crashlytics     3:42 PM

[PickedMail] Oskar has added an iPhone

Oskar <j@oskarzhang.me> has added a new device to: PickedMail com.Thywis.PickedMai You'll need to distribute again to make a build that will w...

Crashlytics     3:42 PM

[PickedMail] Oskar is ready to start testing

Oskar <j@oskarzhang.me> has accepted to test: PickedMail com.Thywis.PickedMai Manage your email notification preferences Copyright © 20...

Read

Uber 收据     6:16 PM

星期三 夜晚取消行程的收据

对于您取消的最近一次拼车行程，由于司机已经在开往您所在位置的途中，因此您需要缴纳 US$2.00 取消费用。 US$2.00 Kedan, 希望有机会再次为您服...

The Information     4:20 PM

Briefing: Didi's raise, Twitter earnings, traged...

 Picked 

CLASSIFYING ELECTRONIC MESSAGES USING INDIVIDUALIZED ARTIFICIAL INTELLIGENCE TECHNIQUES

TECHNICAL FIELD

The present disclosure relates to classifying electronic messages using one or more individualized artificial intelligence techniques.

BACKGROUND

Some content classification techniques require an initial collection of a large amount of training data from a threshold number of users. Content (e.g., a product recommendation) is then classified for one user based on how other users have reacted to the content. For example, an advertising message may be deemed a spam message for one user when 50 other users have identified the advertising message as a spam message.

Difficulties for using these generic classification techniques abound, however. First, accumulating a large amount of training data may require a lengthy ramp-up time, rendering a classification system less capable of producing meaningful results until much later and thus risking user retention.

Second, users who shared similar interests in the past may develop different interest profiles of their own over time, i.e., growing apart from each other. Using a same classification model for a large number of users may therefore run the risk of ignoring some users' specific interests, diminishing user experience for those users.

There is therefore a need for more individualized electronic messages classification techniques.

SUMMARY

An example method includes: identifying message labels for electronic messages; identifying, based on a classification model specific to a first user, a first and a second message labels for a first and a second electronic messages; detecting a user action by the first user on the second electronic message to indicate the first message label is descriptive of the second electronic message; responsive to the user action, re-training the classification model based on tokens produced from the second electronic message to produce an updated classification model specific to the first user; after re-training is completed, detecting an incoming electronic message having a timestamp later in time than timestamps for the first and the second electronic messages; determining that the incoming electronic message shares a predefined number of tokens with the second electronic message; and assigning, based on the updated classification model, the first message label to the incoming electronic message.

The first message label is, in some implementations, assigned to the incoming electronic message based exclusively on the updated classification model.

The method may further include determining that one or more second classification models are specific to a second user different from the first user; and re-training the one or more second classification models without regard to the predefined user action by the first user on the second electronic message.

The first message cluster and the second message cluster are, in some implementations, generated based on a density based clustering method or a distribution based clustering method.

The method may further include maintaining a single message label for the first message cluster.

The method may further include splitting an existing message cluster into two or more message clusters, the two or more message clusters including the first message cluster and the second message cluster.

The first message label to messages included in the first message cluster is assigned, in some implementations, based on a distribution of message labels associated with messages in the first message cluster and a time-biased function that gives more weight to an electronic messaging having a more recent timestamp.

The method may further include extracting text-based content from the plurality of electronic messages; and applying the one or more natural language processing techniques to the extracted text-based content.

The plurality of electronic messages may include video content or audio content.

In other aspects of the present disclosure, computing systems and non-transitory computer storage mediums for executing one or more steps of the above-described methods are also described.

BRIEF DESCRIPTION OF THE DRAWINGS

FIG. 1 is a block diagram illustrating an example computing system.

FIGS. 4A and 4B are block diagrams illustrating example scenarios for classifying electronic messages using one or more individualized artificial intelligence techniques.

FIGS. 5A and 5B are flow charts illustrating an example method for classifying electronic messages using one or more individualized artificial intelligence techniques.

FIG. 6 is a screen image illustrating an example user interface for presenting classified electronic messages.

Figure 2:
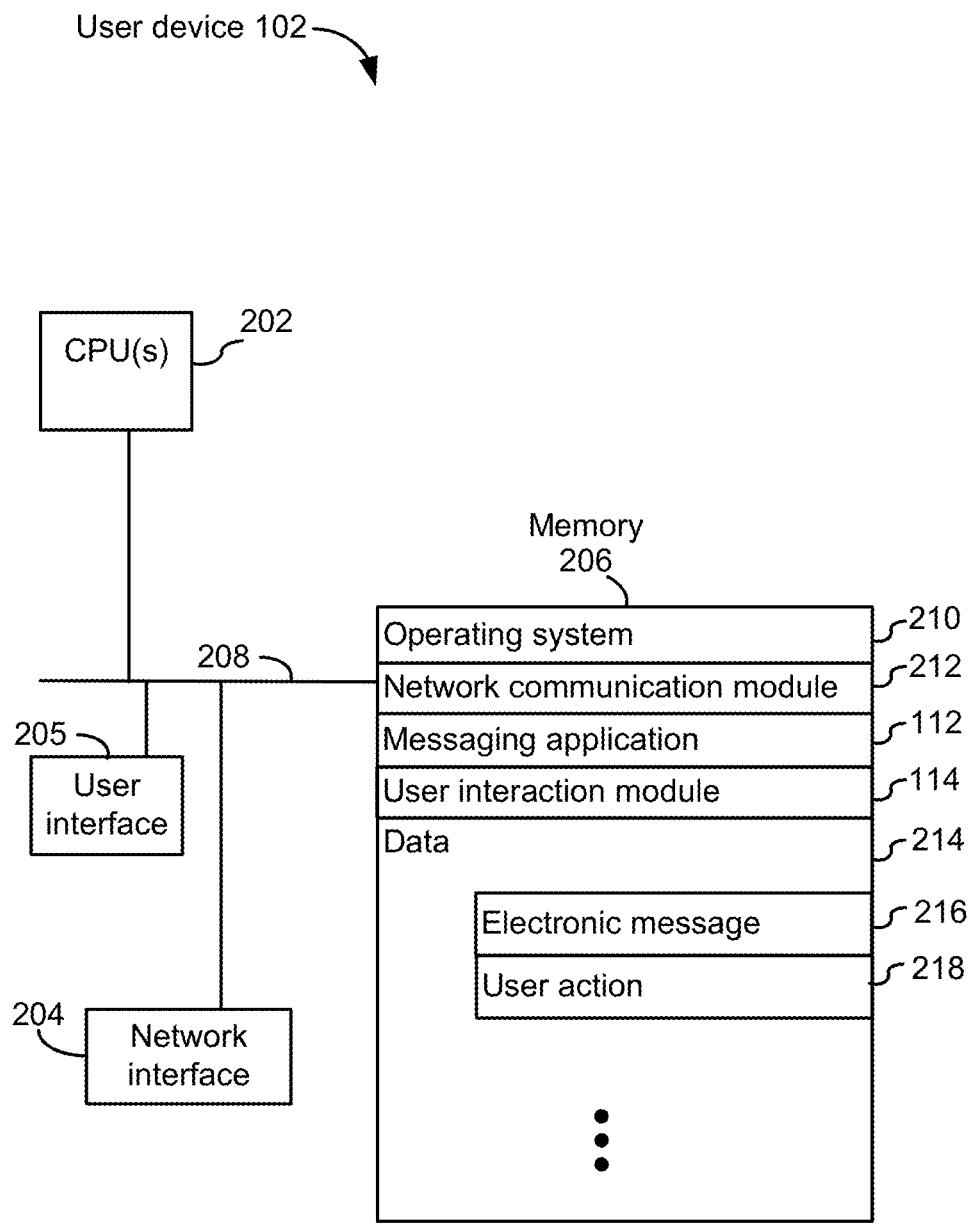
FIG. 2 is a block diagram illustrating an example user device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The implementations described herein provide various technical solutions to individualized message classifications, and in particular to the above-identified technical problems by upon detecting a user preference indicating that the present classification is incorrect, re-training a classification model specific to the user (but not classification models specific to other users), so that the user preference is taken into account without requiring a prolonged training period or significant computing resources, both of which may otherwise be needed for training a generic classification model.

Moreover, different users may have different classification needs. For example, user A may need a classification for online order tracking; and user B may need a classification for receipts and another classification for credit card statements. Using a generic classification method may produce a limited set of generic classifications, failing to address a user's specific needs.

Additional details of implementations are now described in relation to the Figures.

FIG. 1 is a block diagram illustrating an example computing system 100, in accordance with some implementations. The computing system 100 may include one or more user devices 102 (e.g., user devices 102A, 102B, 102C, and 102D), a wireless communication device 103 (e.g., a cellular tower or a wireless access point), a communication network 104, and a classification systems 106. A user device 102 may be a phone, a laptop computer, a tablet computer, or a desktop computer.

The user device 102, in some implementations, presents (e.g., visually or audibly) electronic messages to a user, collects user feedback, and transmits the user feedback to the classifications system 106, which may, in turn, update messages classification rules based on the user feedback. The updated classification rules are then applied to new (e.g., incoming) electronic messages so that the new messages may be presented on the user device 102 for more convenient user access.

A user device 102, in some implementations, includes a messaging application 112 and a user interaction module 114. The messaging application (or app) 112 may be an instant messaging application, an email application, a document viewing or editing application, or any other application that can process text-based content. In other implementations, the messaging application 112 may also process image- or audio-based content, e.g., a video clip, an image, or a sound clip. The user interaction module 114 enables a user of the user device 102 to interact with the messaging application 112, e.g., moving an electronic message, such as an email or a text message, displayed from one display location in the messaging application 112 to another display location in the messaging application 112.

In some implementations, the communication network 104 interconnects one or more user devices 102 with each other, and with the classification systems 106. In some implementations, the communication network 104 optionally includes the Internet, one or more local area networks (LANs), one or more wide area networks (WANs), other types of networks, or a combination of such networks.

The classification system 106 classifies electronic messages associated with a user and presents the classified electronic messages on a user device 102 so that the user can access or modify the classified electronic messages with reduced efforts. The classification system 106 may include a Natural Language Processing (NLP) module 122, a clustering module 124, a classification module 126, a user input processing module 128, a training module 130, and a message database 132.

The NLP module 122 uses one or more NLP techniques to process an electronic message 121 into tokens. For example, the NLP module 122 may remove certain stop words from an email and parse the modified email to produce a number of tokens. For example, the NLP module 122 may produce, from the email "With this deal, you'll save on airfare and lodging which leaves more for entertainment," the following tokens: "with," "deal," "you," "save," "airfare," "lodging," "leaves," "more," and "entertainment."

The clustering module 124 generates, based on tokens produced from electronic messages, one or more message clusters. Some example clustering algorithms or methods that the clustering module 124 include the Density-Based Spatial Clustering of Applications with Noise (DBSCAN) algorithm and the expectation-maximization algorithm.

The user input processing module 128 obtains user inputs from a user device 102, determines a user preference with respect to a previously-classified electronic message, and provides the user preference to the training module 130 and the message database 132. For example, the user input processing module 128 may determine, based on a user's finger gesture on a message, that the user deems the message an unwanted or less important.

The training module 130 trains or re-trains, for example using a statistical classification algorithm, a classification model in accordance with a user's preference determined by the user input processing module 128. The training module 130 may construct an initial classification model based on message tokens and existing message labels. For example, if a majority of electronic messages including the "travel" and "deal" tokens have been assigned, e.g., by another message application, the "travel promotion" label, then the training module 130 may include the instant classification as part of the initial classification model construction. Alternatively, in other implementations, the training module 130 obtains a classification model from another message application and uses that existing model to perform initial message classifications. The training module 130 may also, based on user inputs, update an existing classification model and apply the updated classification model to classify incoming messages.

The message database 132 stores a plurality of electronic messages and metadata associated with these electronic messages, e.g., message labels, timestamps, and tokens.

FIG. 2 is a block diagram illustrating an example user device 102, in accordance with some implementations. The user device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

an operating system 210, which includes procedures for handling various basic system services and for performing hardware dependent tasks;

a network communication module (or instructions) 212 for connecting a user device 102 with other user devices and with the classification system 106 via one or more network interfaces 204 (wired or wireless) or the communication network 104 (FIG. 1);

the messaging application 112 for presenting classified electronic messages to a user;

the user interaction module 114 for enabling a user to interact with the user device 102 and application running on the user device 102 (e.g., the messaging app 112); and data 214, which may include:

one or more electronic messages 216 (e.g., emails, text messages, images, audio clips, and video clips), as well as metadata associated with the electronic messages 216; and one or more user actions on the electronic messages 216, e.g., a user swiping an electronic message towards the right border of a touchscreen display of a user device 102 and a user double-tapping an image with textual content (e.g., to indicate the importance of the textual content to the user).

The user interface 205, in some implementations, includes an input device (e.g., a keyboard, a mouse, a touchpad, a track pad, and a touch screen) for a user to interact with the user device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

The classification system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

an operating system 310, which includes procedures for handling various basic system services and for performing hardware dependent tasks;

a network communication module (or instructions) 312 for connecting the collaboration system 106 with other devices (e.g., the user device 102) via the one or more network interfaces 304 (wired or wireless), or the communication network 104 (FIG. 1);

the NLP module 122 for applying natural language processing techniques to an electronic message to produce tokens;

the clustering module 124 for generating message clusters based on message tokens;

the classification module 126 for assigning a message label to an individual message or to a message cluster;

the user input processing module 128 for determining a user preference with respect to an electronic message based on a user input;

the training module 130 for updating a classification model based on a user preference determined by the user input processing module 128; and the message database 132, which may store:

one or more electronic messages 312 received in a user's messaging account;

one or more message labels 316 assigned to the messages 312; and one or more classification rules 318, e.g., an email including the keywords "important" and "must" should be classified as a "Picked" email, rather than a junk email.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Figure 3:
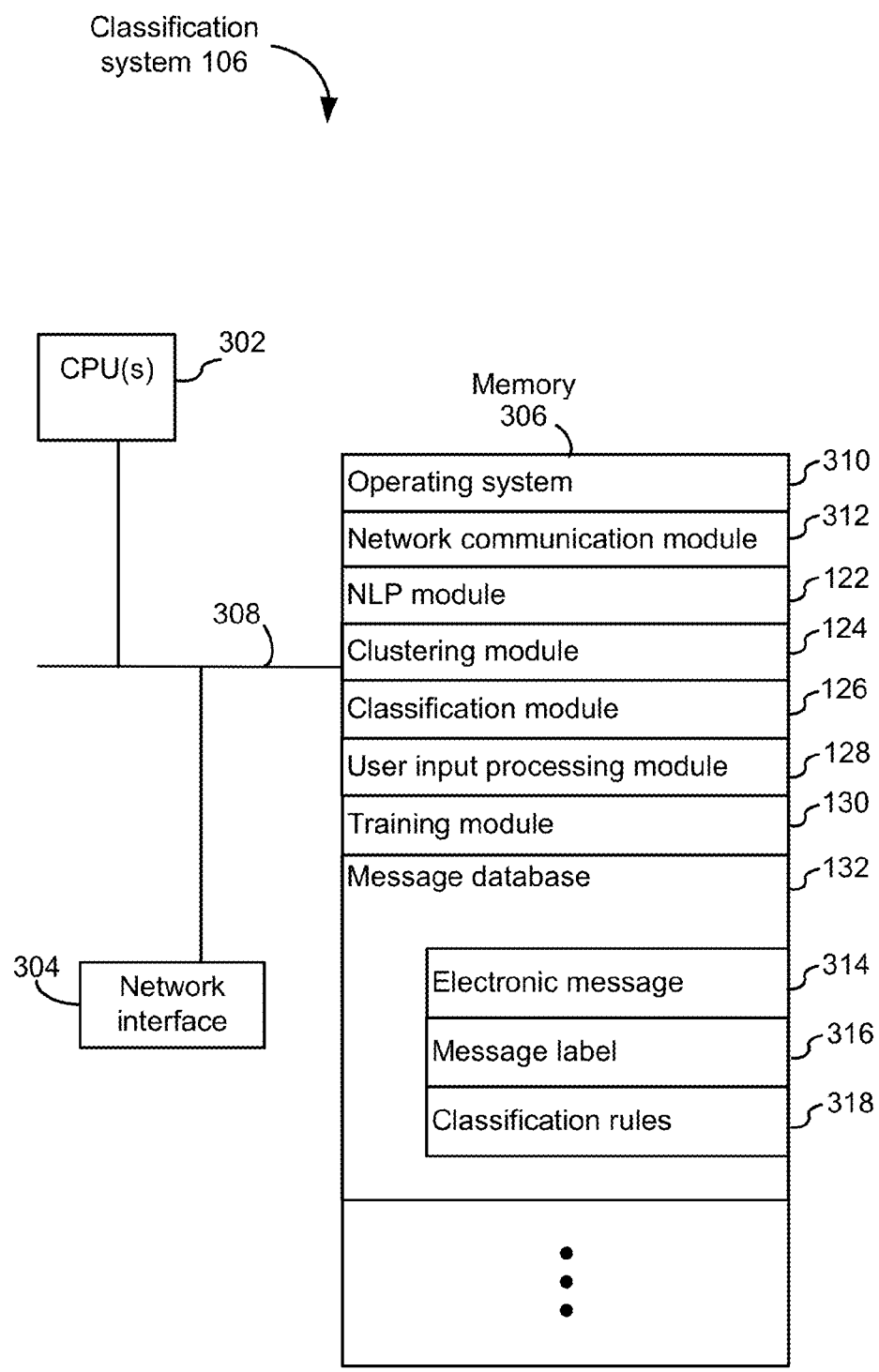
FIG. 3 is a block diagram illustrating an example classification system.

Although FIGS. 2 and 3 show a "user device 102" and a "classification system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4A:
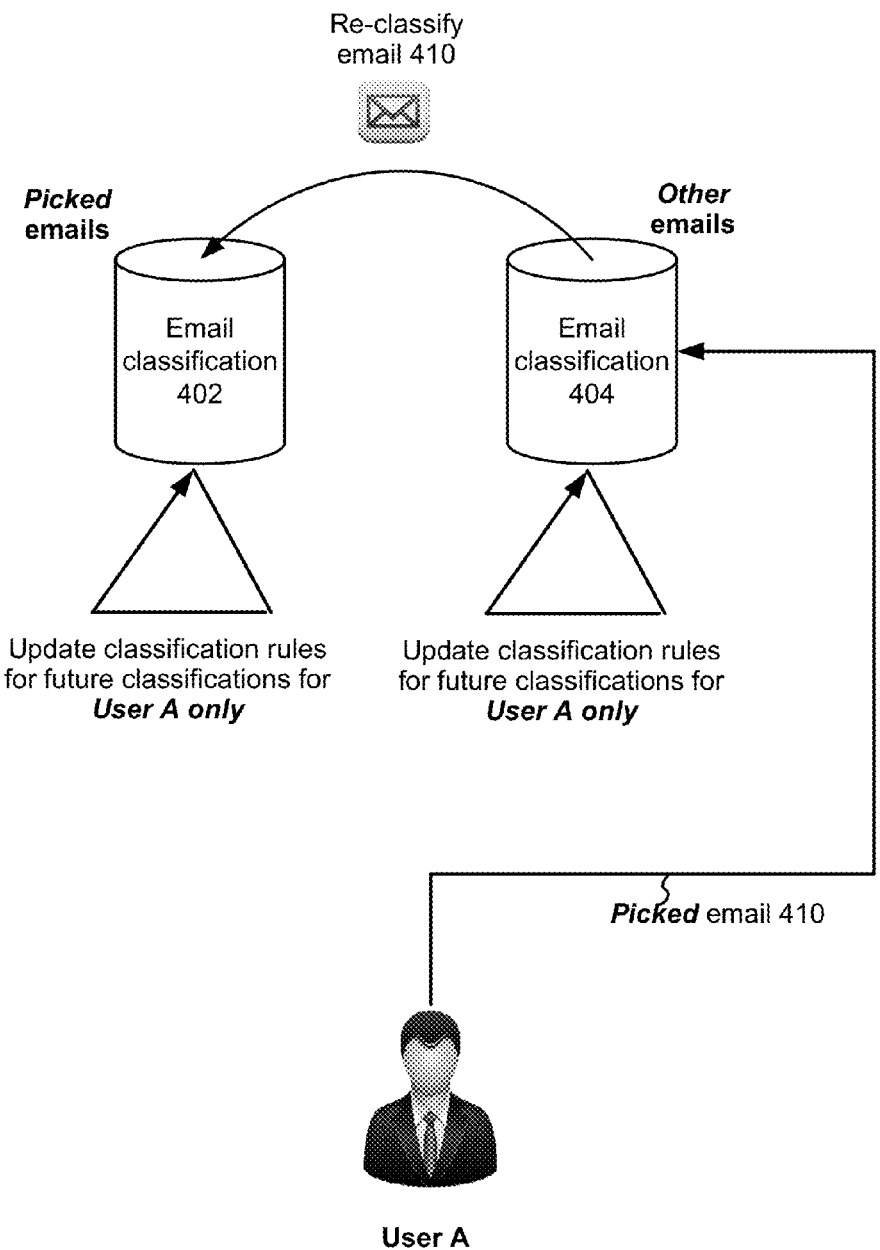

FIGS. 4A and 4B are block diagram illustrating example scenarios 400 for classifying or re-classifying electronic messages using one or more individualized artificial intelligence techniques.

As shown in FIG. 4A, email 410 was originally classified as belonging to email classification 404, for example, the "Others" classification, which indicates that the email 410 may not be of interest to user A.

After reviewing the email 410 or a portion thereof (e.g., a snippet or the subject line), user A "picked" the email 410, for example, by using a finger gesture to move the email 410 from one email tab to another email tab. User A's picking of the email 410 indicates to the classification system 106 that the email 410 is of interest to the user A. As a result of being "picked," the email 410 is re-classified from "Others" as "Picked," which indicates that the email 410 is of interest to the user A.

Responsive to determining that the email 410 is "picked," the classification model is re-trained in accordance with this user-indicated re-classification (e.g., from "Others" to "Picked"). A re-training process may include updating email classification rules specific to the user A. For example, if user A moves (e.g., un-picks) an email sent by a specific sender, e.g., spam_sender@gmail.com from the "Picked" tab to the "Others" tab in the messaging app 112, a re-training process may result in all future incoming email from spam_sender @ gmail.com being classified as "Others." In other words, after the user A un-picks an email sent by spam_sender@gmail.com, the classification system 106 may deem all future incoming messages from spam_sender@gmail.com of less interest to the user A and thus classify these incoming messages into the "Others" class (rather than the "Picked" class). For another example, if user A picks an email including the following tokens: "travel," "deal," and "flight," a re-training process may result in future incoming email from including these tokens (travel," "deal," and "flight") or similar tokens ("travel," "promotion," and "air") being classified as of interested to the user A.

Note that the re-classification applies to only user A's messages. In other words, as shown in FIG. 4B, the re-classification might not, and in some cases does not, result in changes to user B's email classification. For example, future incoming email from spam_sender@gmail.com may still be classified as belonging to the "Others" class. This is technically advantageous, because an individualized classification technique allows different users to develop different interest profiles over time, providing individualized email classification and avoiding generic email classification.

As shown in FIG. 4B, after the re-classification of the email 410, an incoming email 420 arrives at email accounts of both the user A and user B. The classification system 106 may apply one or more NLP techniques to tokenize the incoming email 420. The classification system 106 may next apply a clustering method to the generated tokens to determine to which message cluster the incoming email 420 may belong. The classification system 106 may then apply classification rules specific to each user to determine the classification of the incoming email 420 for each user.

As shown on the left side of FIG. 4B, the classification system 106 applies updated classification rules (e.g., classification rules modified as a result of user A's re-classification of the email 410) to the incoming email 420. As a result, for user A, the incoming email 420 is classified as a "Picked" email, e.g., an email that is potentially of interest to user A.

In contrast, as shown on the right side of FIG. 4B, the classification system 106 applies a different set of classification rules (e.g., the classification rules that are specific to the user B) to the incoming email 420. As a result, for user B, the incoming email 420 is classified as an "others" email, e.g., an email that is potentially of little interest to user A.

Note the different classifications of the same incoming email 420 for user A and user B. User A's re-classification of the email 410 results in (1) the classification rules for user A being updated to reflect user A's specific preference that email 410 be classified as a "picked" email and (2) the incoming email 420, which is similar, content wise, to the email 410, also being classified as a "picked" email. In contrast, for the user B, the incoming email 420 is still classified as an "others" email, because user B has not expressed any interest in classifying the email 410 (which is similar to the incoming email 420) differently. Therefore, although the classification rules for user A and user B may be the same or similar at some point in time, the classification rules for user A and user B may diverge and result in the same email being classified differently for each user.

Figure 5B:
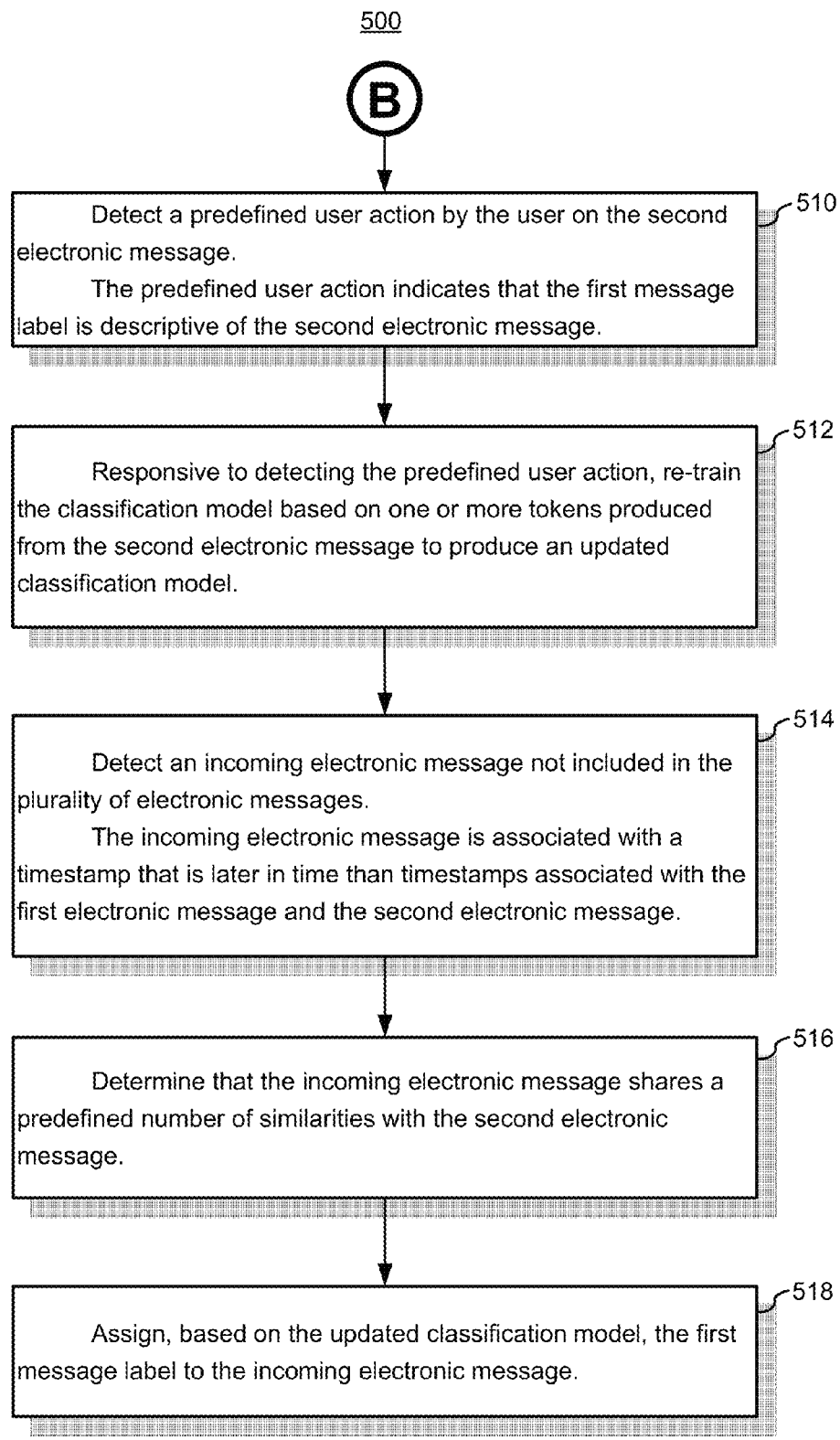

FIGS. 5A and 5B are flow charts illustrating an example method 500 for classifying electronic messages using one or more individualized artificial intelligence techniques. The classification system 106, for example, when properly programmed, can execute the method 500.

In some implementations, the method 500 includes obtaining (502) a plurality of electronic messages associated with a user. The plurality of electronic messages includes a first electronic message and a second electronic message. For example, a user's messaging account may include a number of emails, text-messages, instant-messages, audio clip, video clips, images, and other data files.

The classification system 106 may obtain the raw text, as well as the metadata, of an electronic message. For example, the classification system 106 may import from another messaging application, plain text of an email, an existing label of the email (assigned by a user or the other message application), and a time stamp (e.g., indicating the creation time or the receipt time of an electronic message or its label, if any).

The classification system 106 may classify electronic messages based on existing labels. For example, a text-message having a "personal" label and an email having an "advertisement" label and may be classified as "picked" and "others," respectively.

The classification system 106 may also classify electronic messages using a training process 503, which may include tokenizing the electronic messages and clustering the electronic messages based on the tokens produced. The training process 503 when executed to update an existing classification model may also be referred to as a re-training process, because the existing classification is being re-trained to take into account a user-specific message re-classification.

NLP techniques, for example, may be applied to the plurality of electronic messages. The method 500 may therefore include applying (504) one or more natural language processing techniques to the plurality of electronic messages to produce a plurality of tokens. For example, the classification system 106 may convert the raw message texts into a matrix of Term Frequency-Inverse Document Frequency (TF-IDF) features, in which each matrix row corresponds to features of a message. A TF-IDF matrix may represent keywords identified from messages of a user and the importance (or weight) determined of a keyword within a message. Other statistical methods may also be used to identify keywords from electronic messages. The classification system 106 may optionally perform the following techniques to the corpus of the messages: removing stop-words (e.g., "an," "a," "the," and "at") and punctuations (e.g., commas, periods, and hyphens) from the raw message text; converting characters from lower cases to upper cases, or vice versa, before or after tokenizing; and detecting in which one or more languages a message is written, and applying tokening techniques specific to the identified languages.

The classification system 106 may create message clusters based on the tokens produced from the electronic messages. The method 500 may therefore include generating (506) a first message cluster and a second message cluster based on the plurality of tokens, wherein the first message cluster includes the first electronic message and the second message cluster includes the second electronic message.

A density- or distribution-based clustering method, which does not specify the number of clustering centers, may be applied to the TF-IDF matrix generated in step 504. The clustering process may produce one or more messages clusters, and optionally outliers, e.g., messages that are not similar enough to messages included in an existing cluster. The clustering process may optionally minimize the number of outliers by tuning the clustering parameters. To reduce the total amount of computing resources needed, a clustering process may also include truncating one or more electronic messages to a predefined length. As part of a clustering process, messages having similar tokens (e.g., textual similarities) may be assigned to a same cluster; and messages that do not share a predefined number of similarities (e.g., similar or same tokens) may be assigned to different clusters. For example, a marketing message about office furniture may be assigned to an "in-door decoration" cluster; a message about an auto sales promotion and a message about a user's car rental reservation may both be assigned to an "auto" cluster. Message within the same cluster may have different existing labels, because in some implementations, message clusters are generated based on tokens, rather than based on existing labels. To continue with the above example, the message about an auto sales promotion in the "auto" cluster may have an "advertising" label; and the message about a user's car rental reservation in the same "auto" cluster may have a "reservation" label.

The classification system 106, in some implementations, may normalize the labels of messages within the same cluster. For example, the classification system 106 may assign a single label to all messages within the same cluster, overriding the existing labels of some messages. This is because a classification model trained or constructed based on messages that are in the same cluster, but otherwise have different labels, may have lower classification accuracy. To improve classification accuracy, therefore, it may be beneficial to override the existing labels of some messages so that all messages within a same cluster share a single message label. The method 500 may thus include assigning (508), using a classification model, a first message label to messages included in the first message cluster and a second message label to messages included in the second message cluster.

Initially, the method 500 may begin message classification using an existing classification model or construct a classification model with a selected amount of message tokens produced from existing messages. In some implementations, the initialization of a classification model is deemed less important than the re-training (and updating) the classification model afterwards. This is because a classification model may need to be initialized when a user's interest is still largely unknown to the classification system; while a re-training process aims to capture a user's present and evolving interest; the latter may be more important than the former for at least the purpose of capturing the user's current interest profile.

After existing messages are classified (e.g., assigned labels), the classification system 106 may re-train the classification model, e.g., for the purpose of classifying future incoming messages, in response to detecting a user action overriding an existing message classification. For example, as explained with respect to FIG. 4A, when user A indicates that the email 410 (which was classified as an "others" email) should be classified as a "picked" email, the classification system 106 may trigger a re-training process to update a classification model specific to user A. For example, the method 500 may therefor include detecting (510) a predefined user action by the user on the second electronic message, where the predefined user action indicates that the first message label being descriptive of the second electronic message; and responsive to detecting the predefined user action, re-training (512) the classification model based on one or more tokens produced from the second electronic message to produce an updated classification model.

The re-training process may be referred to as an on-demand re-training, because the re-training of a user's existing classification model is initiated, as a response to detecting a user's modification of an existing message classification, e.g., changing the label of email 410 from "others" to "picked."

In some implementations, at a same given point in time, several classification models (e.g., classification model for different users) may need to be re-trained; and a prioritization algorithm may be used to determine the order in which the classification models are re-trained. A prioritization algorithm may take into account one or more of the following factors: the estimate time for re-training, a user's requirement on accurate classification, the frequency of incoming messages into a user account, and the availability of server resource.

A re-training process 503 may include a NLP process and a clustering process, both of which are similar to the ones described above with reference to the initial message classification. In some implementations, the re-training process 503 may be time-biased toward more recent messages. For example, a time-biased function that assigns more weight to electronic messages with more recent timestamps may be used when constructing a TF-IDF matrix or when normalizing the labels of messages within a same cluster. For example, a time-biased function may, according to the receipt timestamps associated with a user's text-messages, assign more weight to tokens produced from the user's text-messages received today than to tokens produced from the user's emails received yesterday. For another example, a time-biased function may, according to the last-viewed timestamps associated with a user's emails, assign a weight of 1 to tokens produced from an email viewed by the user today, a weight of 1*0.8 to tokens produced from a text-message viewed by the user yesterday, a weigh of $1*0.8^n$ to any remaining message, where n represent the number of days between the date a message was last-viewed and the date the retraining process is initiated.

A time-biased function may be applied to existing clusters to modify token or message weights of messages within the clusters. In some implementations, the message label having the greatest weight within a cluster is assigned to all messages within that cluster, as part of a label normalization process.

An ambiguous cluster may result from the application of a time-biased function. For example, when the label with the highest total weight differs from the label of the majority of messages in a cluster or when the weight difference between two top-weighted labels within a cluster is lower than a predefined amount (e.g., 0.08), the cluster may be deemed an ambiguous cluster. An ambiguous cluster may indicate that messages within the cluster are not similar enough in terms of labeling and the cluster may need to be further divided into two or more clusters and assign different labels. An ambiguous cluster may be split, for example, based on the principle that identical messages or highly similar messages need to be assigned the same label.

After a re-training process is completed, the classification system 106 generates an updated classification model and applies the updated classification model to incoming messages. For example, the method 500 may, therefore, include detecting (514) an incoming electronic message not included in the plurality of electronic messages, the incoming electronic message being associated with a timestamp that is later in time than timestamps associated with the first electronic message and the second electronic message; determining (516) that the incoming electronic message shares a predefined number of similarities with the second electronic message; and assigning (518), based on the updated classification model, the first message label to the incoming electronic message.

Note that, in some implementations, the updated classification model is not applied to re-classify existing messages, e.g., messages that have already arrived at a user's email box. Because a user may not need such re-classification of past messages. For example, the user may have already reviewed or declined to review past messages. Avoiding the re-classification of past messages may therefore save computing resource and avoid confusion, e.g., user confusion may arise when an advertisement email that a user has declined to review is re-classified and presented at a prominent display location to suggest that the email is of great interest to the user.

Further note that the re-training process is applied to update one or more classification models specific to the user who manually performed an override of a system-determined classification—but not to classification models specific to users who have not manually modified a system-determined classification. In these situations, it may be assumed that a user who has not manually modified a system-determined classification agrees with the existing classification; there is, therefore, no need to update the classification models specific to these users. The method 500 may include, for example, determining that one or more second classification models are associated with a second user different from the user; and re-training the one or more second classification models without regard to the predefined user action by the user on the second electronic message.

The classification techniques described in the present disclose may also be applied to non-text based content. For example, the classification system 106 may classify video content, e.g., a standalone video clip or a video attachment to a text based message, based on text transcribed from the video content, e.g., the closed captions included in the video content. For another example, the classification system 106 may classify an audio clip or an image based on text transcribed from the audio clip or text OCR'd (e.g., using an Optical Character Recognition technique) from the image.

FIG. 6 is a screen image illustrating an example user interface 600 for presenting classified electronic messages. As shown in FIG. 6, an example messaging app may include two view tabs 602, e.g., a "Picked" tab and a "Discarded" (or "Others") tab. Messages displayed under the Picked tab may be provided with visual indications 604 to suggest one or more statuses of a "Picked," for example, whether a message has been read or remains unread.

Figure 7:
FIG. 7 is a screen image illustrating an example user interface for presenting classified electronic messages.

FIG. 7 is a screen image illustrating an example user interface 700 for presenting classified electronic messages. As shown in FIG. 7, the visual indications 702 have been updated to reflect that a user has reviewed at least a portion of the messages displayed under the "Picked" tab. As also shown in FIG. 7, a user may assign one or more user-provided message labels 704 (e.g., "Beta Tests," "Bank & Credit," and "The Information") to a message. All or a subset of user-provided message labels 706 may be shown in the user interface 700, and a total number of messages under each label may also be shown to facilitate user review. For example, as shown in the list of user-provided labels 706, there are a total of 3 "Picked" messages, 1 "Updates" message, 2 "Beta Tests" messages, and 1 "Bank & Credit" message.

Figure 8:
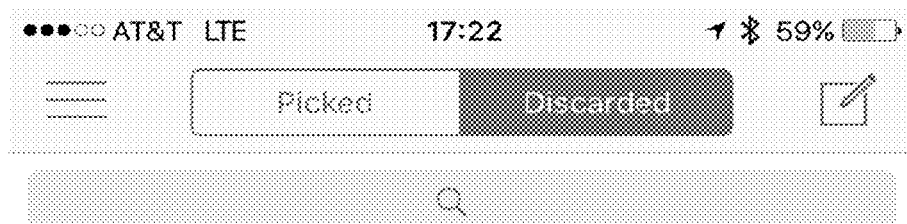
FIG. 8 is a screen image illustrating an example feature relating to classifying electronic messages, responsive to a predefined user action.
Figure 9:
FIG. 9 is a screen image illustrating an example feature relating to re-classify an electronic message, responsive to a predefined user action.

FIG. 8 is a screen image illustrating an example user interface 800 for presenting classified electronic messages. As shown in FIG. 8, a review aid 802 for enabling a user to review messages under a "Discarded" tab with reduced efforts may be provided. For example, a user can cursorily view a portion of a "discarded" message and scroll the message in a manner that crosses the position of the review aid 802, e.g., up or down the line represented by the review aid 802, to indicate that such quick review has been completed. For example, as shown in FIG. 9, under the "Discarded" tab 902, email 904 is scrolled above the review aid 808, marking it as a message that has been viewed by a user.

This review-aid feature for reviewing "discarded" or "others" messages is technically advantageous, because it reduces user efforts to review messages that have preliminarily been deemed by the classification system 106 as of little or no interest to a user.

Figure 10:
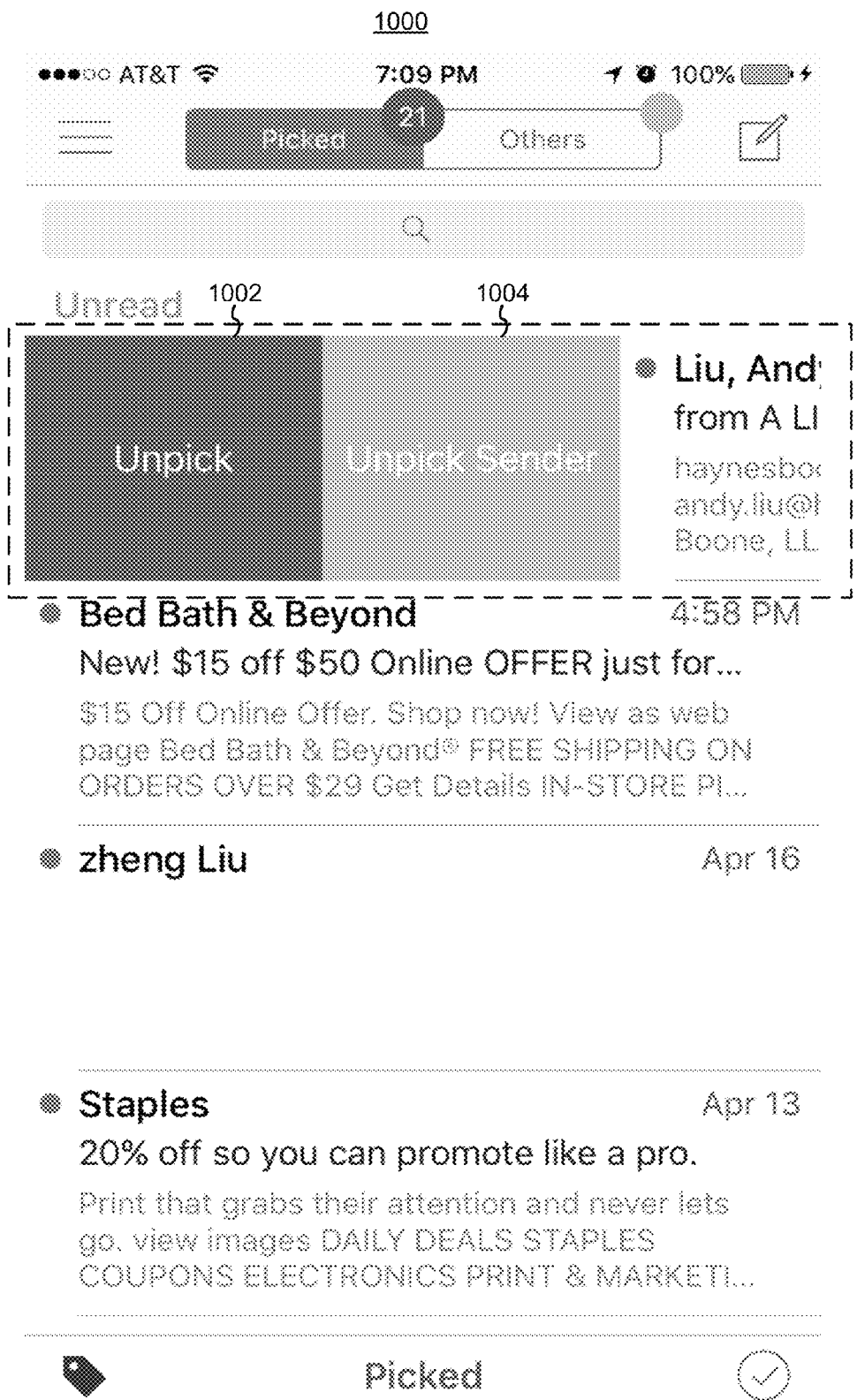
FIG. 10 is a screen image illustrating an example feature relating to re-classify an electronic message, responsive to a predefined user action.

FIG. 10 is a screen image illustrating an example feature 1000 relating to re-classifying an electronic message, responsive to a predefined user action. As shown in FIG. 10, a user interface feature for enabling a user to indicate interests (or lack thereof) towards different aspects of a message is provided. For example, a user may "Unpick" 1002 a message, which may result in messages having similar content as being classified as having low interest to a user ("Discarded" or "Others"). A user may also "Unpick Sender" 1004 a message, which may result in messages from the same (or a similar) sender, but not necessarily having similar content, as being classified as having low interest to a user ("Discarded" or "Others").

Figure 11:
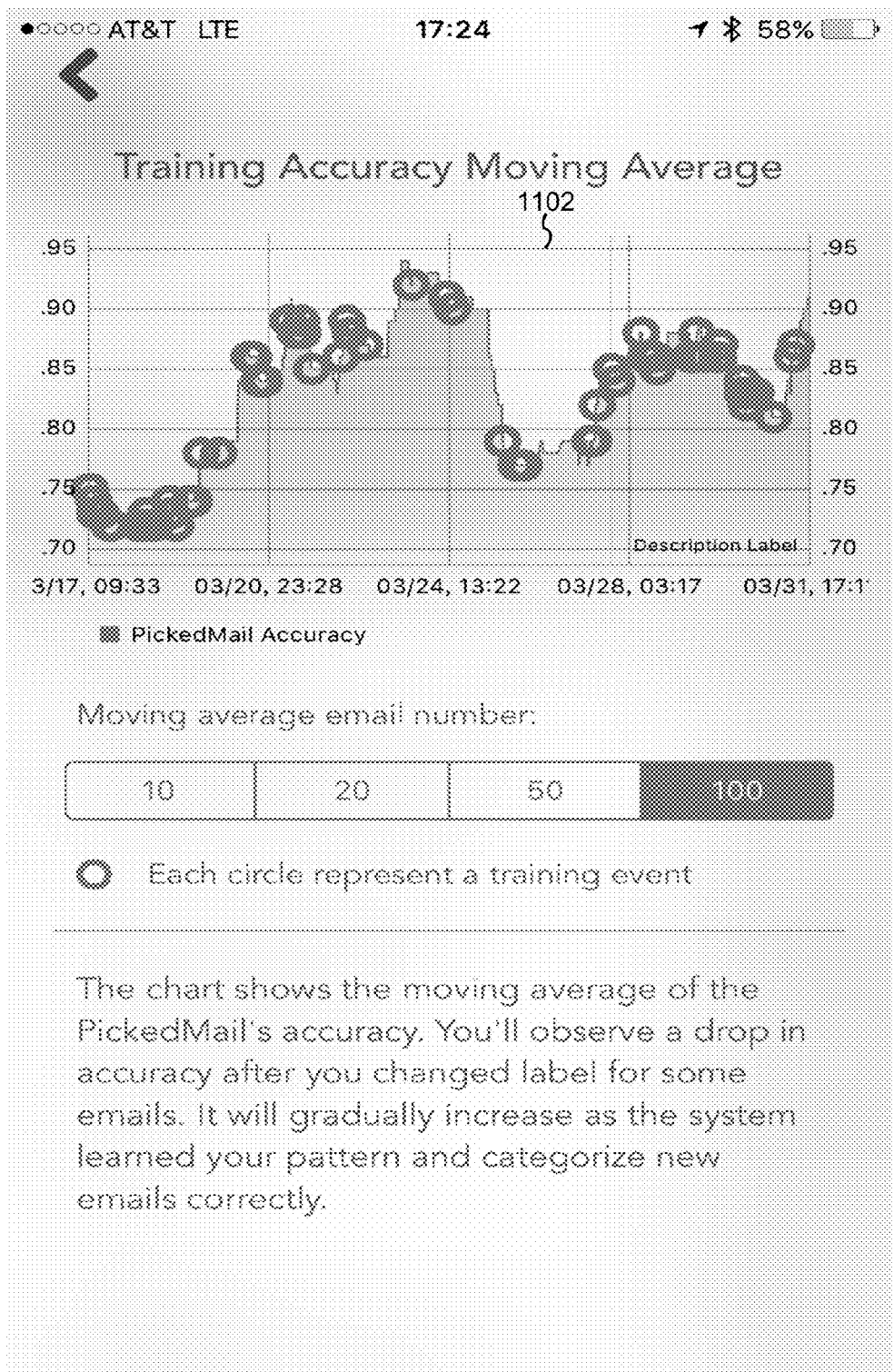
FIG. 11 is a screen image illustrating an example classification accuracy chart.

FIG. 11 is a screen image illustrating an example classification accuracy chart 1100. In some implementations, the messaging app 112 may provide a chart or any other visual clues to illustrate the accuracy of a system-determined message classification. This user interface feature can help a user understand which one of her actions triggered a re-training of the classification model and the performance of the updated classification model.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first content item could be termed a second content item, and, similarly, a second content item could be termed a first content item, without changing the meaning of the description, so long as all occurrences of the "first content item" are renamed consistently and all occurrences of the "second content item" are renamed consistently. The first content item and the second content item are both content items, but they are not the same content item.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A system, comprising:
a non-transitory memory; and
one or more hardware processors coupled to the non-transitory memory and configured to execute instructions to perform operations comprising:
obtaining a plurality of electronic messages associated with a user, the plurality of electronic messages including a first electronic message and a second electronic message;
identifying a plurality of message labels associated with the plurality of electronic messages, the plurality of message labels including a first message label and a second message label;
identifying, based on a classification model specific to a first user, a first message label associated with the first electronic message and a second message label associated with the second electronic message;
producing one or more tokens from the second electronic message;
detecting a finger gesture by the first user on the second electronic message to apply the first message label to the second electronic message;
responsive to detecting the finger gesture, re-training the classification model using a computer based on the one or more tokens produced from the second electronic message to produce an updated classification model specific to the first user;
re-training the classification model comprising:
applying one or more natural language processing techniques to the plurality of electronic messages to produce a plurality of tokens;
generating a first message cluster and a second message cluster based on the plurality of tokens, the first message cluster including one or more electronic messages sharing a predefined number of similarities with tokens produced from the second electronic message;
assigning, the first message label, to messages included in the first message cluster; and
updating the classification model based on the first message label and the messages included in the first message cluster;
after re-training the classification model is completed, detecting an incoming electronic message not included in the plurality of electronic messages, the incoming electronic message being associated with a timestamp that is later in time than timestamps associated with the first electronic message and the second electronic message;
comparing the incoming electronic message with the one or more tokens produced from the second electronic message;
determining that the incoming electronic message shares a predefined number of similarities with the one or more tokens produced from the second electronic message; and
applying, based on the updated classification model, the first message label to the incoming electronic message.

2. The system of claim 1, wherein the first message label is applied to the incoming electronic message based exclusively on the updated classification model.

3. The system of claim 1, wherein the operations further comprise: determining that one or more second classification models are specific to a second user different from the first user; and re-training the one or more second classification models without regard to the finger gesture by the first user on the second electronic message.

4. The system of claim 1, wherein the first message cluster and the second message cluster are generated based on a density based clustering method or a distribution based clustering method.

5. The system of claim 1, wherein the operations further comprise: maintaining a single message label for the first message cluster.

6. The system of claim 1, wherein the operations further comprise: splitting an existing message cluster into two or more message clusters, the two or more message clusters including the first message cluster and the second message cluster.

7. The system of claim 1, wherein applying the first message label to messages included in the first message cluster is based on a distribution of message labels associated with messages in the first message cluster and a time-biased function that gives more weight to an electronic messaging having a more recent timestamp.

8. The system of claim 1, wherein the operations further comprise: extracting text-based content from the plurality of electronic messages; and applying the one or more natural language processing techniques to the extracted text-based content.

9. The system of claim 8, wherein the plurality of electronic messages include video content or audio content.

10. A method comprising:
obtaining a plurality of electronic messages associated with a user, the plurality of electronic messages including a first electronic message and a second electronic message;
identifying a plurality of message labels associated with the plurality of electronic messages, the plurality of message labels including a first message label and a second message label;
identifying, based on a classification model specific to a first user, a first message label associated with the first electronic message and a second message label associated with the second electronic message;
producing one or more tokens from the second electronic message;
detecting a finger gesture by the first user on the second electronic message to apply the first message label to the second electronic message;
responsive to detecting the finger gesture, re-training the classification model using a computer based on the one or more tokens produced from the second electronic message to produce an updated classification model specific to the first user;
re-training the classification model comprising:
applying one or more natural language processing techniques to the plurality of electronic messages to produce a plurality of tokens;
generating a first message cluster and a second message cluster based on the plurality of tokens, the first message cluster including one or more electronic messages sharing a predefined number of similarities with tokens produced from the second electronic message;
assigning, the first message label, to messages included in the first message cluster; and
updating the classification model based on the first message label and the messages included in the first message cluster;
after re-training the classification model is completed, detecting an incoming electronic message not included in the plurality of electronic messages, the incoming electronic message being associated with a timestamp that is later in time than timestamps associated with the first electronic message and the second electronic message;
comparing the incoming electronic message with the one or more tokens produced from the second electronic message;
determining that the incoming electronic message shares a predefined number of similarities with the one or more tokens produced from the second electronic message; and
applying, based on the updated classification model, the first message label to the incoming electronic message.

11. The method of claim 10, wherein the first message label is applied to the incoming electronic message based exclusively on the updated classification model.

12. The method of claim 10, further comprising: determining that one or more second classification models are specific to a second user different from the first user; and re-training the one or more second classification models without regard to the finger gesture by the first user on the second electronic message.

13. The method of claim 10, wherein the first message cluster and the second message cluster are generated based on a density based clustering method or a distribution based clustering method.

14. The method of claim 10, further comprising: maintaining a single message label for the first message cluster.

15. The method of claim 10, further comprising: splitting an existing message cluster into two or more message clusters, the two or more message clusters including the first message cluster and the second message cluster.

16. The method of claim 10, wherein applying the first message label to messages included in the first message cluster is based on a distribution of message labels associated with messages in the first message cluster and a time-biased function that gives more weight to an electronic messaging having a more recent timestamp.

17. A non-transitory computer readable storage medium storing one or more programs, the one or more programs comprising instructions, which when executed by a computing system with one or more processors, cause the computing system to execute a method of:
obtaining a plurality of electronic messages associated with a user, the plurality of electronic messages including a first electronic message and a second electronic message;
identifying a plurality of message labels associated with the plurality of electronic messages, the plurality of message labels including a first message label and a second message label;
identifying, based on a classification model specific to a first user, a first message label associated with the first electronic message and a second message label associated with the second electronic message;
producing one or more tokens from the second electronic message;
detecting a finger gesture by the first user on the second electronic message to apply the first message label to the second electronic message;
responsive to detecting the finger gesture, re-training the classification model using a computer based on the one or more tokens produced from the second electronic message to produce an updated classification model specific to the first user;
re-training the classification model comprising:
applying one or more natural language processing techniques to the plurality of electronic messages to produce a plurality of tokens;
generating a first message cluster and a second message cluster based on the plurality of tokens, the first message cluster including one or more electronic messages sharing a predefined number of similarities with tokens produced from the second electronic message;
assigning, the first message label, to messages included in the first message cluster; and
updating the classification model based on the first message label and the messages included in the first message cluster;

after re-training the classification model is completed, detecting an incoming electronic message not included in the plurality of electronic messages, the incoming electronic message being associated with a timestamp that is later in time than timestamps associated with the first electronic message and the second electronic message;

comparing the incoming electronic message with the one or more tokens produced from the second electronic message;

determining that the incoming electronic message shares a predefined number of similarities with the one or more tokens produced from the second electronic message; and applying, based on the updated classification model, the first message label to the incoming electronic message.

18. The non-transitory computer readable storage medium of claim 17, the method further comprising: determining that one or more second classification models are specific to a second user different from the first user; and re-training the one or more second classification models without regard to the finger gesture by the first user on the second electronic message.

19. The non-transitory computer readable storage medium of claim 17, wherein the first message cluster and the second message cluster are generated based on a density based clustering method or a distribution based clustering method.

20. The non-transitory computer readable storage medium of claim 17, wherein applying the first message label to messages included in the first message cluster is based on a distribution of message labels associated with messages in the first message cluster and a time-biased function that gives more weight to an electronic messaging having a more recent timestamp.

* * * * *